United States Patent
Rowell et al.

(10) Patent No.: US 10,847,898 B2
(45) Date of Patent: Nov. 24, 2020

(54) ANTENNA AND A METHOD FOR MEASURING TWO ORTHOGONAL POLARIZATIONS

(71) Applicant: Rohde & Schwarz GmbH & Co. KG, Munich (DE)

(72) Inventors: Corbett Rowell, Munich (DE); Thomas Rossberger, Geiersthal (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 16 days.

(21) Appl. No.: 16/112,106

(22) Filed: Aug. 24, 2018

(65) Prior Publication Data

US 2020/0067202 A1 Feb. 27, 2020

(51) Int. Cl.
*H01Q 21/24* (2006.01)
*H01Q 15/08* (2006.01)
*G01J 4/04* (2006.01)
*H01Q 25/00* (2006.01)

(52) U.S. Cl.
CPC ............. *H01Q 21/24* (2013.01); *G01J 4/04* (2013.01); *H01Q 15/08* (2013.01); *H01Q 25/001* (2013.01)

(58) Field of Classification Search
CPC ........ H01Q 21/24; H01Q 15/08; H01Q 15/02; H01Q 15/04; H01Q 19/06; H01Q 25/008; H01Q 3/46; H01Q 13/085; H01Q 25/001; G01J 4/04

See application file for complete search history.

(56) References Cited

U.S. PATENT DOCUMENTS

| | | | |
|---|---|---|---|
| 4,488,156 A | 12/1984 | DuFort et al. | |
| 2018/0175507 A1* | 6/2018 | Diaz | H01Q 19/08 |
| 2018/0269576 A1* | 9/2018 | Scarborough | H01Q 1/288 |

* cited by examiner

*Primary Examiner* — Dimary S Lopez Cruz
*Assistant Examiner* — Michael M Bouizza
(74) *Attorney, Agent, or Firm* — Ditthavong & Steiner P.C.

(57) ABSTRACT

The invention relates to a dual orthogonally polarized antenna and to a method for measuring two orthogonal polarizations. The orthogonally polarized antenna includes a first antenna and a second antenna for measuring two orthogonal polarizations, each of the two antennas having a phase center. Additionally, a first lens constructed with two different radii of curvature, is placed around the dual orthogonally polarized antenna.

18 Claims, 7 Drawing Sheets

ANTENNA AND A METHOD FOR MEASURING TWO ORTHOGONAL POLARIZATIONS

TECHNICAL FIELD

The invention relates to a dual orthogonally polarized antenna and a method for measuring two orthogonal polarizations.

BACKGROUND ART

Lens antennas, preferably dielectric lens antennas are especially of interest for millimeter- and submillimeter wave applications, since they can be realized very compact for the millimeter- and submillimeter wave range. Dielectric lenses that are combined with an antenna to form a dielectric lens antenna are very flexible and simple to design and fabricate. The lens target output can range from a simple collimated beam to more complex multi-objective specifications. Thus, lenses are capable of modifying the phase and/or the amplitude of the primary feed radiation pattern in order to transform it into a prescribed output radiation pattern.

Compared to reflectors that are also capable of performing the aforementioned modifications of the primary feed radiation pattern, the lens operation principle is not based on reflection but on the refraction of electromagnetic waves at the lens surfaces or within the lens dielectric material. One of the main advantages of lenses over reflectors is that the feed and its supporting structure do not block the aperture of the antenna.

Numerous of single polarized antennas such as an aperture coupled Vivaldi antenna are used for millimeter- and submillimeter wave applications and are capable of transmitting and/or receiving single polarized radiation. To avoid the need for rotating the single polarized antenna to transmit/receive radiation in various polarization directions, single polarized antennas are combined to form an antenna capable of emitting/receiving radiation in various polarization directions without the need for rotating the antenna. An antenna widely used, providing two polarization directions is the dual orthogonally polarized Vivaldi antenna.

It is desired to provide a suitable lens for a combination of two single polarized antennas orientated orthogonally with respect to each other and each antenna having a phase center. Even though the two phase centers have an offset with respect to each other, similar beam patterns for orthogonal polarizations shall be maintained.

U.S. Pat. No. 4,488,156 relates to the field of antennas, more particularly to geodesic lens antennas for use in scanning. In radar applications, where the antenna is involved only in a "listening" mode, constant beam shape and constant performance over the completely scanned area are desirable in order to detect an unexpected object and to accurately map its location. The cited document aims to improve prior art antenna systems based on optical principles having a poor performance in wide-angle scanning or listening applications. U.S. Pat. No. 4,488,156 discloses a geodesic lens scanning antenna having two concentric dome-shaped conductors, both of which are connected at their circular peripheries to a dielectric filled flared waveguide horn. The two concentric conductors act as a Transverse Electromagnetic Mode (TEM) waveguide and the phase velocity is independent of the frequency of operation. The flared horn is annular and affixed to the periphery of these two concentric conductors and serves as a dielectric lens.

However, even though the cited document discloses a geodesic lens antenna including two concentric surfaces capable of scanning a narrow beam in the scan plane and an additionally dielectric lens, the flared horn, to focus a beam orthogonal to the scan plane, the document is silent to disclose how to form and/or modify radiation patterns by using just one lens. Furthermore, the document does not disclose at all to use a lens in combination with a dual polarized antenna.

Accordingly, there is a need to provide a suitable lens in combination with a dual orthogonally polarized antenna and a method using a suitable lens for measuring two orthogonal polarizations. Particularly, the lens has to be constructed such that it is able to compensate for offsets of the phase centers of the two antennas that form the overall orthogonally polarized antenna.

Moreover, it is desired that the lens, additionally to the function of modifying a radiation pattern, serves as a cover or an overall enclosure for the dual orthogonally polarized antenna to protect said antenna from external influences.

SUMMARY OF THE INVENTION

According to a first aspect of the invention, a dual orthogonally polarized antenna is provided. Said orthogonally polarized antenna comprises a first antenna and a second antenna for measuring two orthogonal polarizations, each of the two antennas having a phase center. Furthermore, a first lens constructed with two different radii of curvature is placed around the dual orthogonally polarized antenna.

Advantageously, one lens only, having two different radii of curvature is able to compensate for the offset between the two antenna phase centers. Additionally or alternatively, the lens having two different radii of curvature is able to focus to the waves of each one of the two antennas. Said waves of each one of the two antennas are preferably orientated orthogonally with respect to each other. The lens, preferably a dielectric lens, is usually provided for beam shaping and adaption of the opening angle of a radar beam based on application-specific requirements.

According to a first preferred implementation form of the first aspect, the two antennas are orientated orthogonally to each other.

Advantageously, without the need for rotating the antenna at least two orthogonal polarizations are measurable, since two single antennas are combined and orientated orthogonally with respect to each other to form one dual orthogonally polarized antenna.

According to a further preferred implementation form of the first aspect, the phase center of one of the two antennas is offset with respect to the phase center of the other antenna.

The assembly of two single polarized antennas, each having its own phase center, to one overall antenna inevitably results in an offset of the two phase centers with respect to each other. Advantageously, the phase centers of the two antennas are only up to preferably 5 mm apart from each other with respect to the main beam direction. An offset up to 5 mm can be compensated by using a lens having two different radii of curvature. Said lens having two different radii of curvature is able to focus to the orthogonally shifted waves of each one of the two antennas.

According to a further preferred implementation form of the first aspect, a first radius of curvature of the two different radii of curvature is the radius in relation to the first antenna and a second radius of curvature of the two different radii of curvature is the radius in relation to the second antenna.

Advantageously, the first radius of curvature of the two different radii of curvature is related to the first antenna and the second radius of curvature of the two different radii of curvature is related to the second antenna. Preferably, the first radius of curvature of the lens is depending on the distance between the phase center of the first antenna and the lens. The second radius of curvature of the lens is depending on the distance between the phase center of the second antenna and the lens.

According to a further preferred implementation form of the first aspect, the first lens is made of a foam.

Advantageously, Rohacell® foam is used to form the lens. Rohacell® foam has a low density, a temperature resistance up to 220° C. and a closed cell structure. Furthermore, Rohacell® foam has dielectric properties similar to air, provides a very good strength to weight ratio and is easy to work with. Moreover, a lens made of foam can be easily placed around the dual orthogonally polarized antenna.

According to a further preferred implementation form of the first aspect, the foam is milled into lens shape.

Advantageously, the lens made of foam is easy to manufacture. By exemplarily using a CNC milling machine, the desired lens shape of a lens can easily be milled into the foam.

According to a further preferred implementation form of the first aspect, the surfaces formed by the two radii of curvature are positioned orthogonally to each other.

Advantageously, the surfaces formed by the two different radii of curvature are positioned with respect to the two antennas. Since the two antennas are positioned orthogonally with respect to each other, also the surfaces formed by the two different radii of curvature are positioned orthogonally to each other.

According to a further preferred implementation form of the first aspect, at the intersection of the surfaces formed by the two radii of curvature a blending function is provided. More precisely, it is the tip of the lens, which is the portion, where the two radii of curvature intersect.

Advantageously, the blending function reduces errors. At the intersection of the two different radii of curvature, neither the appropriate radius of curvature required for the first antenna nor the appropriate radius of curvature required for the second antenna is present. Exemplarily, the blending function can be realized by providing a radius of curvature for the intersection surface that is the mean value (r1+r2)/2 of the first radius of curvature r1 and the second radius of curvature r2. It is further conceivable to vary the radius of curvature for the intersection surface depending on the position of the surface. Preferably, the surface of the intersection is a wave form. Any suitable radius of curvature for the intersection surface of the lens can be chosen, preferably the determined radius of curvature is depending on the first radius of curvature and/or the second radius of curvature.

According to a further preferred implementation form of the first aspect, the first lens is starting from the radiation emitting/receiving side of the dual orthogonally polarized antenna extending at least to the phase center of the first antenna.

Advantageously, the lens is extending from the radiation emitting/receiving side of the antenna to the phase center of the first antenna. The extended lens shape below the antenna, more precisely, the part of the lens, that is not used to modify or focus a radiation pattern, just serves as a housing and does not affect the radiation pattern. The extended lens further stabilizes the overall antenna and protects the antenna from external influences. In case the phase center of the first antenna is farther away from the radiation emitting/receiving side than the phase center of the second antenna, the phase center of the second antenna is also surrounded by the extended lens. If the phase center of the second antenna is farther away from the radiation emitting/receiving side than the phase center of the first antenna, the phase center of the second antenna is not surrounded by the extended lens.

According to a further preferred implementation form of the first aspect, the first lens is starting from the radiation emitting/receiving side of the dual orthogonally polarized antenna extending at least to the phase center of the second antenna.

Advantageously, the lens is extending from the radiation emitting/receiving side of the antenna to the phase center of the second antenna. The extended lens shape below the antenna just serves as a housing and does not affect the radiation pattern. The extended lens further stabilizes the overall antenna and protects the antenna from external influences. In case the phase center of the first antenna is farther away from the radiation emitting/receiving side than the phase center of the second antenna, the phase center of the first antenna is not surrounded by the extended lens. If the phase center of the second antenna is farther away from the radiation emitting/receiving side than the phase center of the first antenna, the phase center of the first antenna is also surrounded by the extended lens.

According to a further preferred implementation form of the first aspect, the first lens is starting from the radiation emitting/receiving side of the dual orthogonally polarized antenna extending beyond the phase center of the first and second antenna in a cylindrical fashion.

Advantageously, no matter which phase center is farther away from the radiation emitting/receiving side, the lens extends from said radiation emitting/receiving side beyond the phase center of the first and second antenna, which further ensures stability and protection of the overall antenna. Thus, the lens serves as an overall enclosure, additionally to the radiation pattern forming functionalities provided by the lens. It is further conceivable that the lens is extending beyond the phase center of the first and second antenna in a spherical fashion.

According to a further preferred implementation form of the first aspect, a second lens is provided with the dual orthogonally polarized antenna to focus a beam emitted by the dual orthogonally polarized antenna.

Advantageously, a second lens is provided that further increases the functionality of the inventive dual orthogonally polarized antenna by allowing focusing a beam emitted by said antenna.

According to a further preferred implementation form of the first aspect, the second lens is placed around the first lens, and/or wherein the second lens has a higher density than the first lens.

Advantageously, the second lens is placed around the first lens that is further placed around the dual orthogonally polarized antenna. Since said second lens is placed around the first lens, it is capable of protecting the first lens from unwanted influences, in particular from rough handling and vibrations during transport of the antenna and from mechanical shocks during the set-up of the antenna. Furthermore, the second lens can protect the first lens in case of mechanical shock or impact that might occur during the operation of the antenna.

According to a second aspect of the invention, a method for measuring two orthogonal polarizations with a dual orthogonally polarized antenna is provided. The method comprises a first antenna and a second antenna, each antenna having a phase center. The method further includes the step of providing a first lens that is constructed with two different radii of curvature and the step of placing the first lens around the dual orthogonally polarized antenna.

According to a first preferred implementation form of the second aspect, the method further comprises the step of assembling the first antenna and the second antenna such that they are orientated orthogonally to each other.

According to a further preferred implementation form of the second aspect, the method further comprises the step of constructing the first lens such that a first radius of curvature is the radius in relation to the first antenna, and the step of constructing the first lens such that a second radius of curvature is the radius in relation to the second antenna.

According to a further preferred implementation form of the second aspect, the method further comprises the step of constructing the first radius of curvature and the second radius of curvature such that the surfaces formed by the two radii of curvature are positioned orthogonally to each other.

According to a further preferred implementation form of the second aspect, the method further comprises the step of placing the first lens around the orthogonally polarized antenna such that said first lens starting from the radiation emitting/receiving side of the dual orthogonally polarized antenna extends at least to the phase center of the first antenna. Additionally or alternatively, the method further includes the step of placing the first lens around the orthogonally polarized antenna such that said first lens starting from the radiation emitting/receiving side of the dual orthogonally polarized antenna extends at least to the phase center of the second antenna.

BRIEF DESCRIPTION OF THE DRAWING

Exemplary embodiments of the invention are now further explained with respect to the drawings by way of example only, and not for limitation. In the drawings.

DETAILED DESCRIPTION OF THE PREFERRED EMBODIMENTS

Figure 1:
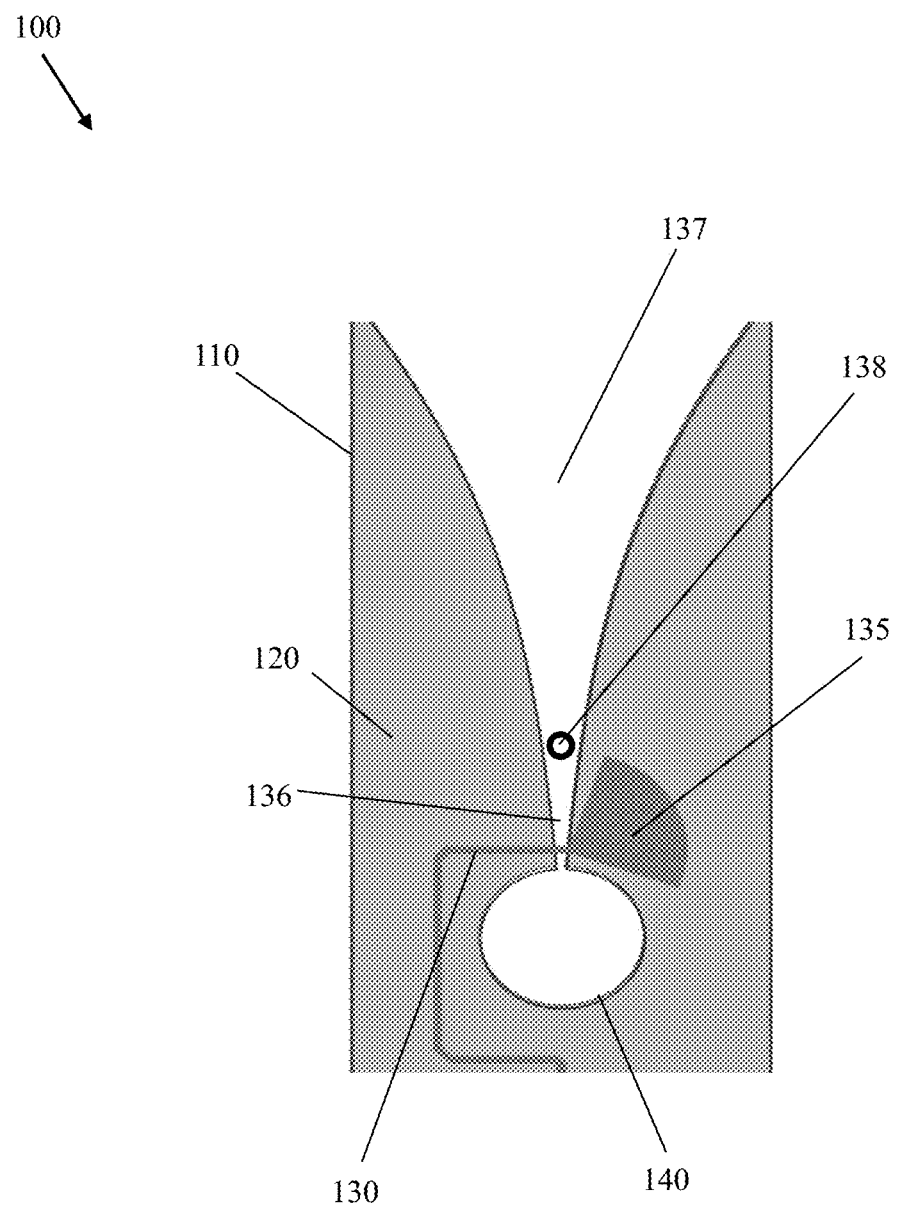
FIG. 1 shows a block diagram of a single polarized antenna having an aperture coupling.

FIG. 1 illustrates a block diagram of a single polarized antenna having an aperture coupling, a so-called single polarized Vivaldi antenna or tapered slot antenna. The aperture coupled, single polarized antenna 100 is a co-planar broadband-antenna that consists of a substrate 110 that is depicted transparent to show the structure of the top side and the bottom side of the substrate 110 at one glance. The single polarized antenna 100 has a phase center 138, which is the point from which the electromagnetic radiation spreads spherically outward with the phase of the radiated signal being equal at any point on the sphere.

The bottom side of the substrate includes a micro-strip line 130, preferably made of copper, that is terminated with a sector-shaped area 135, preferably made of copper. Said sector-shaped area 135 has the function to broadband match the antenna to its supply system in strip-line technology. It is further conceivable that instead of the micro-strip line 130 a coaxial cable is provided that is terminated with a direct coaxial connection. The antenna realized on the top side of the substrate 110 is fed via coupling by the micro-strip line 130 located on the bottom side of the substrate 110.

The top side of the substrate 110 is provided with a conducting material 120, preferable copper, and with a symmetrical slot line 136 in the conducting material that opens at one end in an exponentially tapered pattern 137. The other end of the symmetrical slot line 136 is short-circuited by a stub 140 designed to be circular.

The polarization of the single polarized antenna 100 is linear, thus the electric field lines are parallel to the substrate 110 and the beam direction of the antenna is the direction in which the conical slot 137 expands.

The single polarized Vivaldi antenna can further be made from a solid piece of sheet metal or from a dielectric plate metalized on both sides.

A dielectric lens (not shown) positioned on the antenna 100 can be constructed such that it has the same radius of curvature as the spherical wave front, emitted by the phase center of the antenna 100, at the lens. It is further conceivable that the lens has a radius of curvature that ensures that a desired radiation pattern is formed by the lens for a given focal length. The focal length within this application is the distance from the phase center 138 of the first antenna 100 to the lens (not shown) positioned on the antenna 100.

By using two antennas, each suitable for emitting/receiving linear polarized radiation and by arranging the two antennas orthogonally with respect to each other, an overall dual polarized antenna suitable of emitting/receiving two orthogonal polarizations, exemplarily vertically polarized and horizontally polarized radiation, is formed. The combination of two antennas is further described in FIG. 2.

Figure 2:
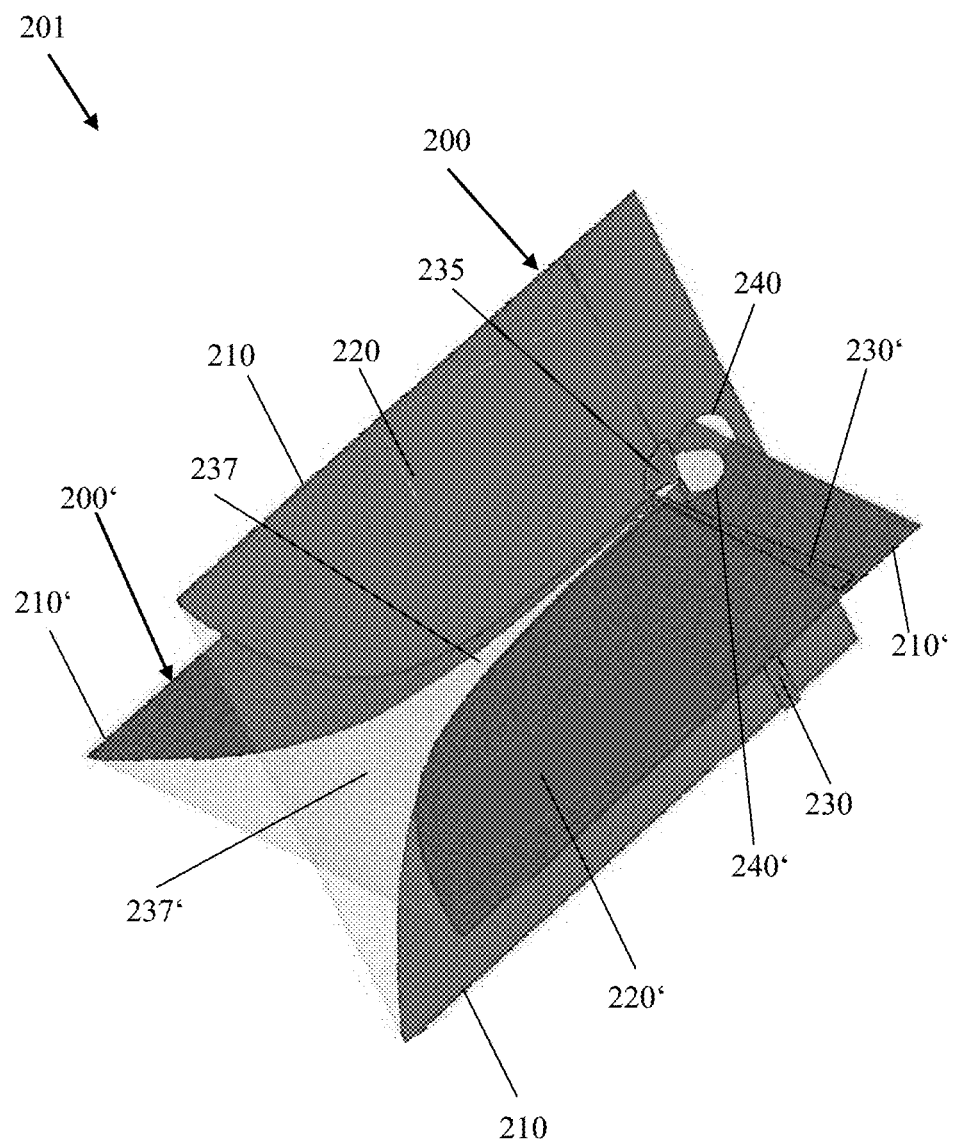
FIG. 2 shows a block diagram of a dual orthogonally polarized antenna consisting of a first and second single polarized antenna.

FIG. 2 illustrates an exemplary embodiment of a dual orthogonally polarized antenna consisting of a first and second single polarized antenna.

FIG. 2 shows a dual orthogonally polarized antenna 201 comprising of a first antenna 200 formed of a substrate 210 that is depicted transparent to show top and bottom side at one glance. On the bottom side the micro-strip line 230 and the sector shaped area 235 is shown. The top side of the substrate 210 is provided with a conducting material 220, preferably copper and with a symmetrical slot line 236 in the conducting material that opens at one end in an exponentially tapered pattern 237. The other end of the symmetrical slot line 236 is short-circuited by a stub designed to be circular 240. To allow readability of FIG. 2, the symmetrical slot line 236 is not marked with a referral number, but the slot line is identical to the slot line 136 of FIG. 1.

An identical second antenna 200' is affixed to the first antenna 200 such that the two antennas 200, 200' are orientated orthogonally with respect to each other. Due to the assembly of the two antennas to one overall antenna, the phase center of the first antenna is offset from the phase center of the second antenna. The offset of the phase centers of the overall dual polarized antenna 401 is clearly shown in FIG. 4.

If a dielectric lens just having one radius of curvature is placed on the overall antenna 201, only one wave front emitted by the two antennas can have the same radius of curvature as the lens, since due to the offset of the phase centers, the radius of curvature of the wave front from the first antenna is different from the radius of curvature of the wave front from the second antenna at the lens.

Moreover, a lens with just one radius of curvature is only suitable for focusing a radiation pattern coming from one phase center. When the position of the phase center changes, the focal length changes and the lens cannot perform the required function. For each radius of curvature, only a specific focal length, which is the distance from the phase center to the lens, is appropriate.

Thus, the overall dual polarized antenna 201 needs to be provided with a lens having two different radii of curvature to compensate for the offset of the phase centers of the two antennas 200, 200'.

Figure 3A:
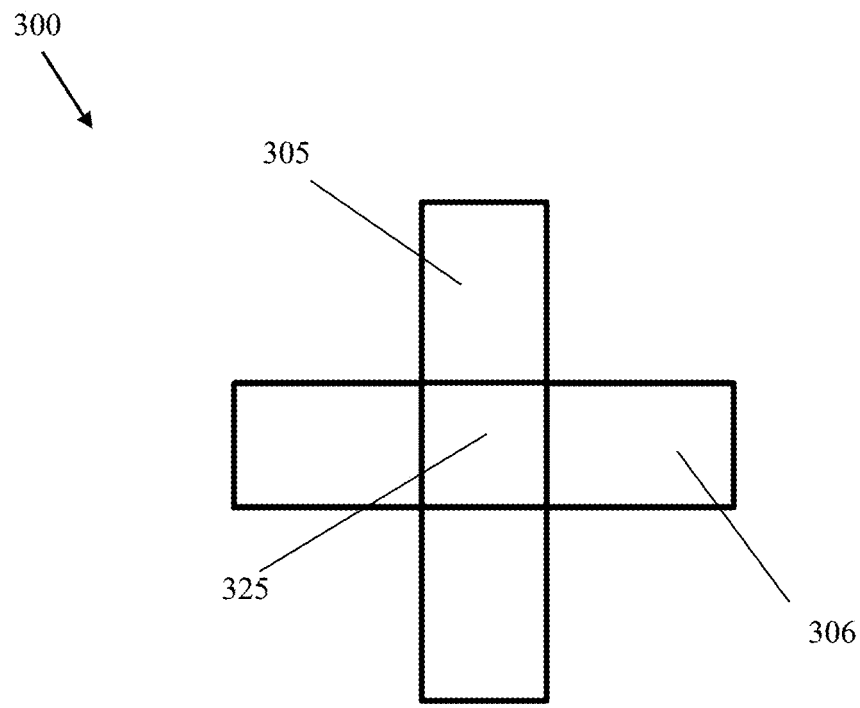
FIG. 3A shows a block diagram of the first lens of the inventive orthogonally polarized antenna in top view constructed with two different radii of curvature.

FIG. 3A illustrates an exemplary embodiment of a lens 300, hereinafter referred to as the first lens 300 that is placed around the orthogonally polarized antenna to form the inventive orthogonally polarized antenna.

FIG. 3A shows a top view of the lens with a surface 305 having a radius of curvature r1 and with a second surface 306 having a second radius of curvature r2. Surface 305 is related to the first antenna 200 and the second surface 306 is related to the second antenna 200'. Since the two antennas 200, 200' are orientated orthogonally with respect to each other, the related surfaces 305, 306 are also orientated orthogonally with respect to each other. The intersection of the two surfaces 305, 306 forms a surface area 325.

Figure 3B:
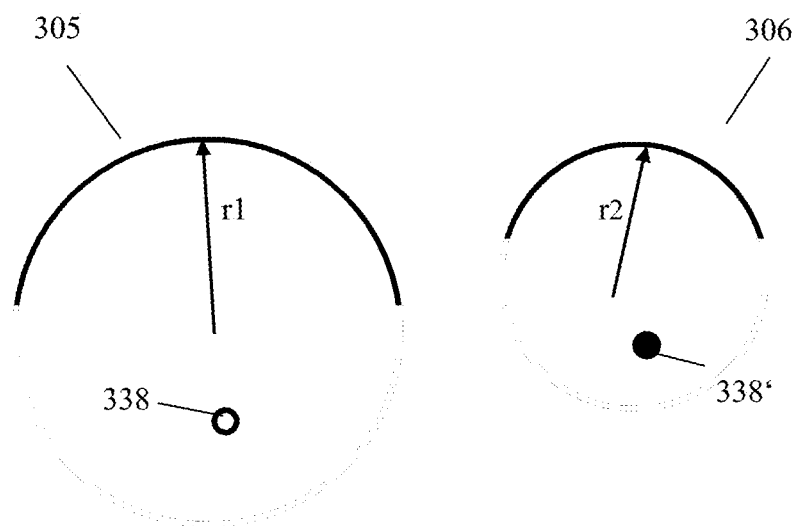
FIG. 3B shows a block diagram of the first lens having a first radius of curvature and a second radius of curvature in side view.

FIG. 3B illustrates an exemplary embodiment of the first lens in side view, the lens having a first radius of curvature r1 and a second radius of curvature r2.

The surface 305 of the first lens 300 has a first radius of curvature r1. The surface 306 of the first lens 300 has a second radius of curvature r2. It can be clearly seen in FIG. 3B that the two radii of curvature r1 and r2 are different from each other.

Each of the two antennas 200, 200' emits electromagnetic radiation that spreads spherically outward from its respective phase center. The radius of curvature of the spherical wave changes while the spherical wave front is travelling away from its phase center. The radius of curvature of the spherical wave front, emitted by the first antenna 200, at the surface 305 of the lens 300 has to be the same as the radius of curvature r1 of the surface 305. Furthermore, the radius of curvature of the spherical wave front emitted by the second antenna 200' at the surface 306 of the lens 300 has to be the same as the radius of curvature r2 of the surface 306.

Alternatively, the radius of curvature r1 of the first lens has to be determined based on the distance between the phase center of the first antenna and the first lens and the radius of curvature r2 of the first lens has to be determined based on the distance between the phase center of the second antenna and the first lens.

Figure 3C:
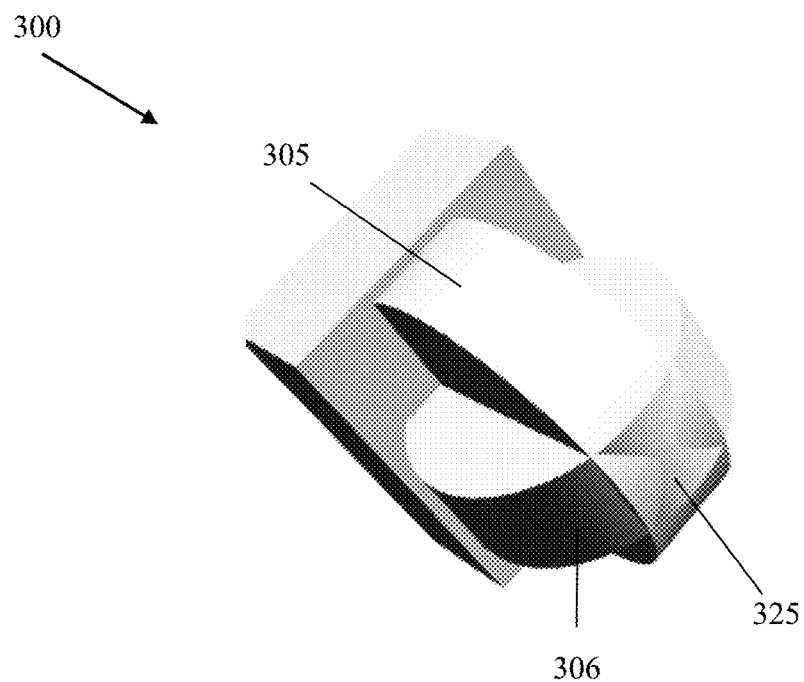
FIG. 3C shows a three-dimensional (3-D) representation of the first lens of the inventive orthogonally polarized antenna depicted in FIG. 3A as two-dimensional (2-D) representation.

FIG. 3C illustrates an exemplary embodiment of the lens 300, hereinafter referred to as the first lens 300 that is placed around the orthogonally polarized antenna to form the inventive orthogonally polarized antenna. FIG. 3C is the 3-D representation of FIG. 3A.

The intersection of the two surfaces 305, 306 that form the surface area 325 is shown in more detail as in FIG. 3A. The surface area 325 can be shaped such that only the radius of curvature r1 is present or that only the radius of curvature r2 is present. It is further conceivable that the radius of curvature depends on the location of the surface area 325. It is further conceivable that the surface area 325 is corrugated to form a wave-like structure.

Figure 3D:
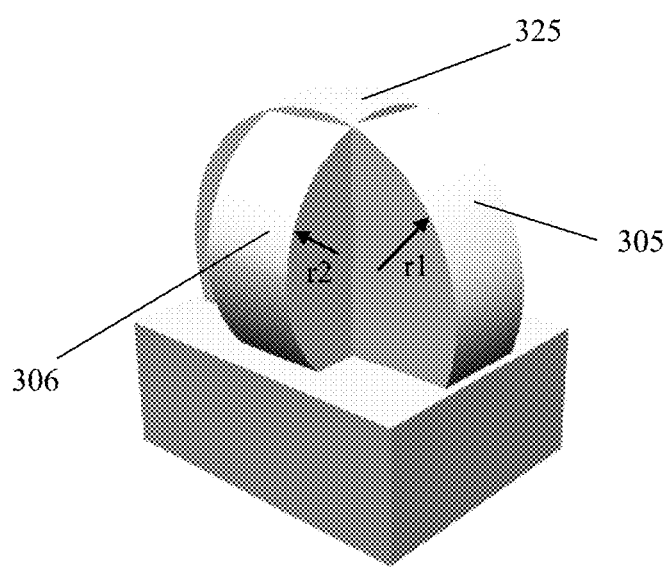
FIG. 3D shows a 3-D representation of the two different radii of curvatures of the first lens of the inventive orthogonally polarized antenna depicted in FIG. 3B as 2-D representation.

FIG. 3D illustrates a 3-D representation of the 2-D drawings according to FIG. 3B. FIG. 3D shows lens 300 in side view, the lens having a first radius of curvature r1 and a second radius of curvature r2.

Figure 4:
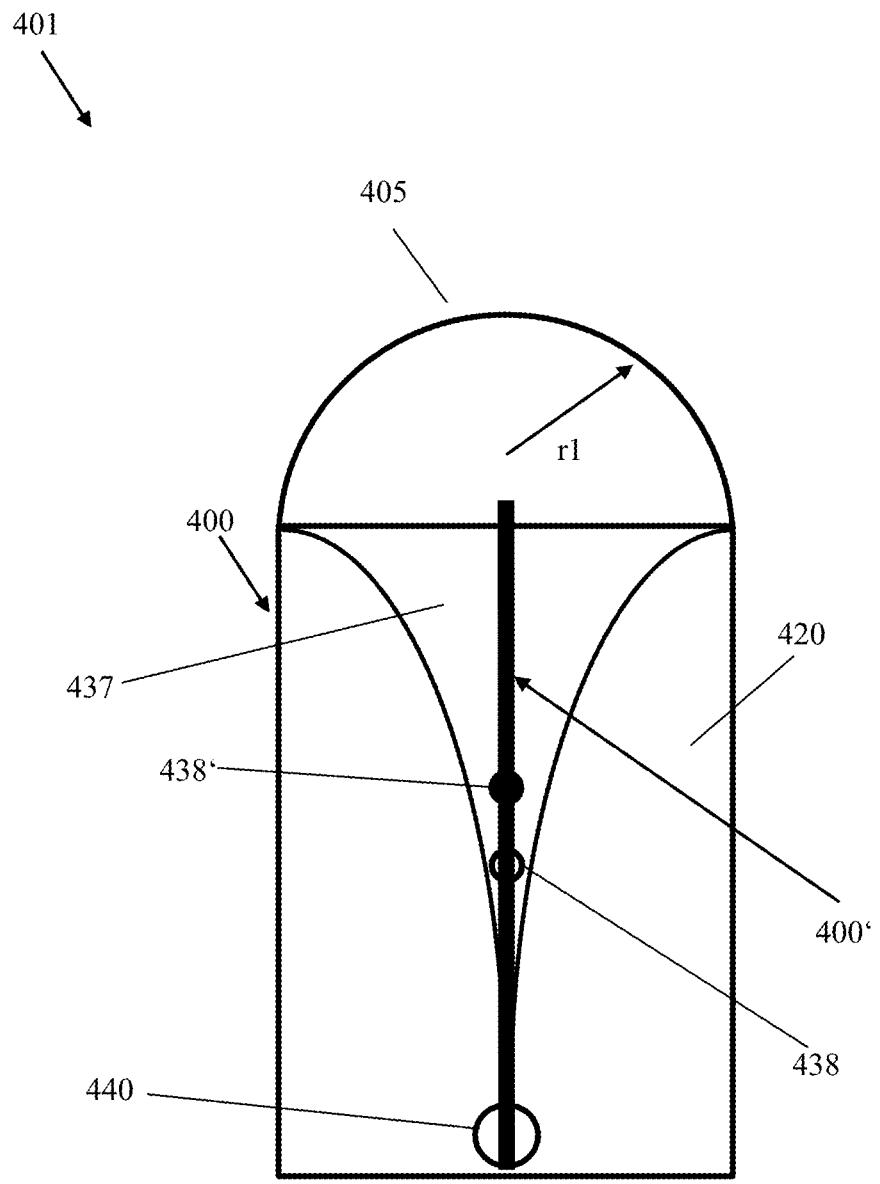
FIG. 4 shows a block diagram of a side view of the inventive orthogonally polarized antenna depicting the first antenna and the first lens attached to it having a first radius of curvature related to the first antenna.

FIG. 4 illustrates an exemplary embodiment of the inventive dual orthogonally polarized antenna 401 including the first lens 300, shown in top view in FIG. 3A, wherein the first lens surface 405 associated with the first antenna 400 has a first radius of curvature r1. Since the presented view is a side view of the first antenna 400, the second antenna 400' is just depicted as a line.

FIG. 4 further shows the phase center 438 of the first antenna 400 and the phase center 438' of the second antenna 400'. To distinguish the two phase centers, the phase center 438 of the first antenna 400 is drawn as a ring and the phase center 438' of the second antenna 400' is drawn as a circular area. The offset between the two phase centers 438 and 438' with respect to the main beam direction can be clearly seen in FIG. 4. Furthermore, the radius of curvature r1 of the lens surface 405 related to the first antenna 400 is depicted in FIG. 4.

It is even conceivable to construct a lens having more than two different radii of curvature, in case more than two single polarized antennas are combined to one overall antenna.

Figure 5:
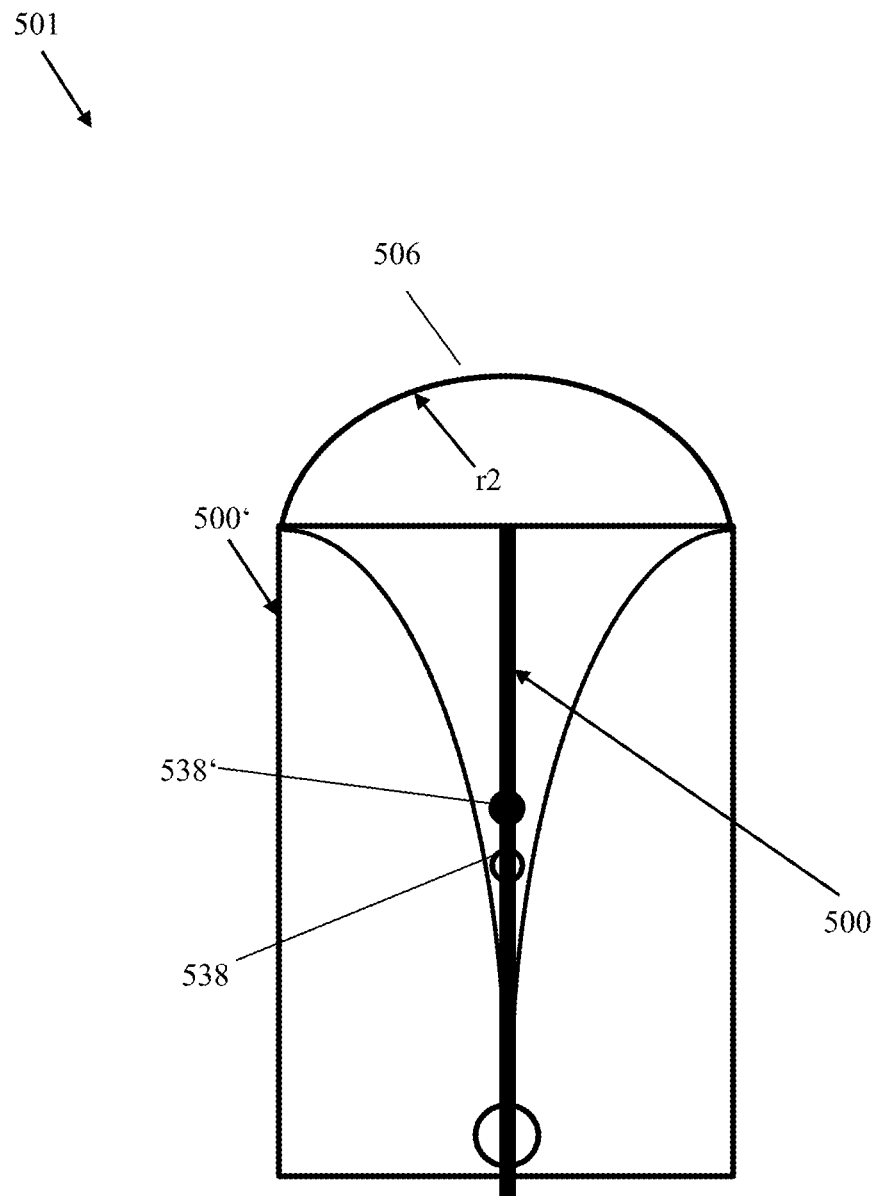
FIG. 5 shows a block diagram of a side view of the inventive orthogonally polarized antenna depicting the second antenna and the first lens attached to it having a second radius of curvature related to the second antenna.

FIG. 5 illustrates an exemplary embodiment of the inventive dual orthogonally polarized antenna 501 including the lens 300, shown in top view in FIG. 3A, wherein the surface 506 of the first lens associated with the second antenna 500' has a second radius of curvature r2. Since the presented view is a side view of the second antenna 500', the first antenna 500 is just depicted as a line. FIG. 5 shows the phase center 538' of the second antenna 500' and the phase center 538 of the first antenna 500. The offset between the two phase centers 538 and 538' with respect to the main beam direction can be clearly seen in FIG. 5. To distinguish the two phase centers, the phase center 538 of the first antenna 500 is drawn as a ring and the phase center 538' of the second antenna 500' is drawn as a circular area.

Figure 6:
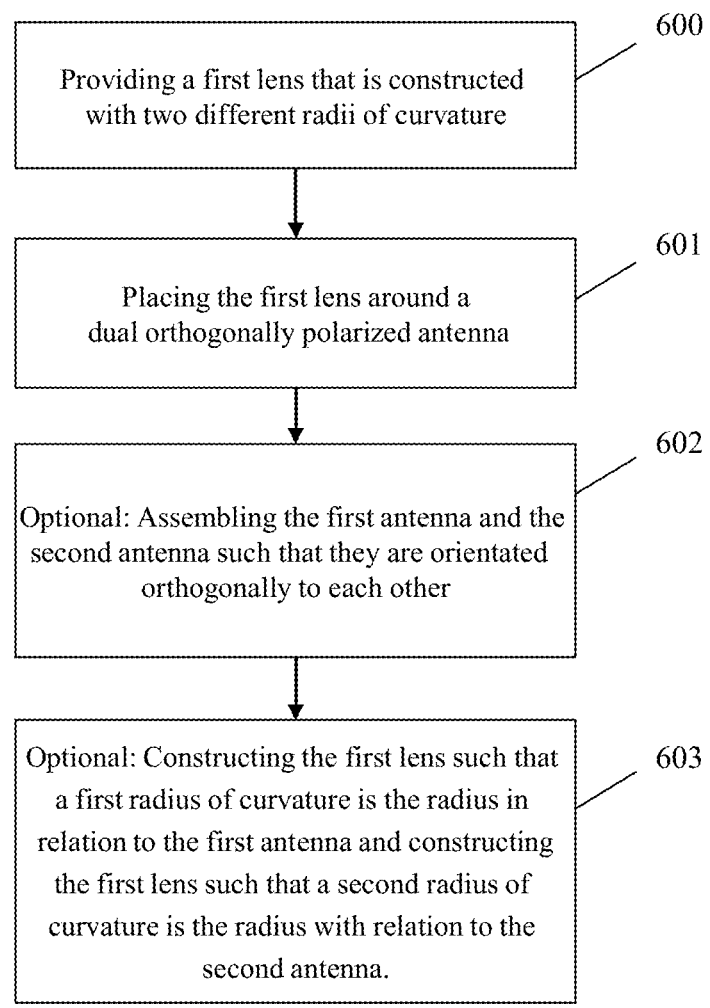
FIG. 6 shows a flow chart of an exemplary embodiment of a measurement method of the second aspect of the invention.

Finally, FIG. 6 shows a flow chart of the inventive measurement method. In a first step S600 a first lens is provided that is constructed with two different radii of curvature.

In a following step S601 the first lens is placed around a dual orthogonally polarized antenna, preferably a dual polarized Vivaldi antenna made of two linear polarized Vivaldi antennas. Since the overall dual orthogonally polarized antenna is composed of two separate antennas, even though the two antennas are constructed identically including the phase centers, there is an offset of the two phase centers due to the assembly process. Therefore, said first lens is constructed with two different radii of curvature for compensating the phase center offset of the two antennas.

In an optional further step S602 the two separate linear polarized antennas are assembled such that the first antenna and the second antenna are orientated orthogonally to each other.

In an optional last step S603 it is further described how the first lens is constructed. The first lens is constructed such that a first radius of curvature is the radius in relation to the first antenna and a second radius of curvature is the radius in relation to the second antenna. By determining said constructional features, it is made clear that the first radius of curvature of the first lens is depending on the first antenna, particularly on the position of the phase center of the first antenna, more precisely on the distance between the phase center of the first antenna and the first lens.

Furthermore, it is made clear that the second radius of curvature of the first lens depends on the second antenna, particularly on the position of the phase center of the second antenna, more precisely on the distance between the phase center of the second antenna and the first lens. If each phase center of each of the two antennas would be at the same location respectively having the same distance to the lens, a lens having just one radius of curvature would be sufficient. However, since the phase center of the first antenna has an offset with respect to the phase center of the second antenna and vice versa, the first lens has to be constructed with two different radii of curvature to compensate for said offset.

While various embodiments of the present invention have been described above, it should be understood that they have been presented by way of example only, and not for limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A dual orthogonally polarized antenna comprising a first antenna and a second antenna for measuring two orthogonal polarizations, each of the two antennas having its own phase center,
    wherein a first lens is placed around the dual orthogonally polarized antenna,
    wherein said first lens has two surfaces each having its own radius of curvature and orientated orthogonally with respect to each other in accordance with the first antenna and the second antenna, and
    wherein said first lens is constructed with two radii of curvature wherein the two radii of curvature are related to the two surfaces of the first lens and are different from each other.

2. The dual orthogonally polarized antenna according to claim 1,
    wherein the two antennas are orientated orthogonally to each other.

3. The dual orthogonally polarized antenna according to claim 1,
    wherein the phase center of one of the two antennas is offset with respect to the phase center of the other antenna.

4. The dual orthogonally polarized antenna according to claim 1,
    wherein a first radius of curvature of the two different radii of curvature is the radius in relation to the first antenna and a second radius of curvature of the two different radii of curvature is the radius in relation to the second antenna.

5. The dual orthogonally polarized antenna according to claim 1,
    wherein the first lens is made of foam.

6. The dual orthogonally polarized antenna according to claim 5,
    wherein the foam is milled into lens shape.

7. The dual orthogonally polarized antenna according to claim 1,
    wherein, the surfaces formed by the two radii of curvature are positioned orthogonally to each other.

8. The dual orthogonally polarized antenna according to claim 7,
    wherein at the intersection of the surfaces formed by the two radii of curvature a blending function is provided.

9. The dual orthogonally polarized antenna according to claim 1,
    wherein the first lens is starting from the radiation emitting/receiving side of the dual orthogonally polarized antenna extending at least to the phase center of the first antenna.

10. The dual orthogonally polarized antenna according to claim 1,
    wherein the first lens is starting from the radiation emitting/receiving side of the dual orthogonally polarized antenna extending at least to the phase center of the second antenna.

11. The dual orthogonally polarized antenna according to claim 1,
    wherein the first lens is starting from the radiation emitting/receiving side of the dual orthogonally polarized antenna extending beyond the phase center of the first and second antenna in a cylindrical fashion.

12. The dual orthogonally polarized antenna according to claim 1,
    wherein a second lens is provided with the dual orthogonally polarized antenna to focus a beam emitted by the dual orthogonally polarized antenna.

13. The dual orthogonally polarized antenna according to claim 12,
    wherein the second lens is placed around the first lens, and/or wherein the second lens has a higher density than the first lens.

14. A method for measuring two orthogonal polarizations with a dual orthogonally polarized antenna including a first antenna and a second antenna, each antenna having a phase center, the method comprising the steps of:
    providing a first lens that is constructed in such a way that it has two orthogonally orientated surfaces each with its own radius of curvature wherein the two radii are different from each other,
    placing the first lens around the dual orthogonally polarized antenna.

15. The method according to claim 14,
wherein the method further comprises the step of
assembling the first antenna and the second antenna such that they are orientated orthogonally to each other.

16. The method according to claim 14,
wherein the method further comprises the step of
constructing the first lens such that a first surface with a first radius of curvature is in relation to the first antenna, and
constructing the first lens such that a second surface with a second radius of curvature is in relation to the second antenna.

17. The method according to claim 14,
wherein the method further comprises the step of
constructing the first radius of curvature and the second radius of curvature such that the surfaces formed by the two radii of curvature are positioned orthogonally to each other.

18. The method according to claim 14,
wherein the method further comprises the step of
placing the first lens around the orthogonally polarized antenna such that said first lens starting from the radiation emitting/receiving side of the dual orthogonally polarized antenna extends at least to the phase center of the first antenna, and/or
placing the first lens around the orthogonally polarized antenna such that said first lens starting from the radiation emitting/receiving side of the dual orthogonally polarized antenna extends at least to the phase center of the second antenna.

* * * * *